US008467711B2

(12) United States Patent
Lee

(10) Patent No.: US 8,467,711 B2
(45) Date of Patent: Jun. 18, 2013

(54) IMAGE FORMING APPARATUS INCLUDING LATERAL SLIP PREVENTION MEMBER

(75) Inventor: Dong Woo Lee, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 744 days.

(21) Appl. No.: 12/474,288

(22) Filed: May 29, 2009

(65) Prior Publication Data

US 2009/0317153 A1 Dec. 24, 2009

(30) Foreign Application Priority Data

Jun. 18, 2008 (KR) ........................ 10-2008-0057392

(51) Int. Cl.
*G03G 15/20* (2006.01)
*G03G 15/00* (2006.01)
*B65G 39/16* (2006.01)

(52) U.S. Cl.
USPC ............................ 399/329; 399/165; 198/806

(58) Field of Classification Search
USPC .................. 399/162, 329, 165; 198/806, 807, 198/810.03; 474/172, 173, 198
See application file for complete search history.

(56) References Cited

U.S. PATENT DOCUMENTS 2,012,089 A * 8/1935 Sayers
2,109,923 A * 3/1938 Lemmon
2,109,956 A * 3/1938 Corbin .......................... 198/806
2,239,687 A * 4/1941 Parker ........................... 198/806
2,569,419 A * 9/1951 Kendall
2,609,084 A * 9/1952 Hersey .......................... 198/806
2,718,156 A * 9/1955 Wright
4,369,878 A * 1/1983 Millevoi ....................... 198/807
6,053,832 A * 4/2000 Saito
2003/0175056 A1* 9/2003 Sato et al.
2009/0166159 A1* 7/2009 Murayama .................... 198/806

FOREIGN PATENT DOCUMENTS

JP 57060347 A * 4/1982
JP 58109307 A * 6/1983
JP 58113009 A * 7/1983
JP 10240049 A * 9/1998
JP 2000-075729 3/2000
JP 2007240937 A * 9/2007

OTHER PUBLICATIONS

English Abstract of JP-2000-075729.
Machine English language translation of JP-2000-075729.

* cited by examiner

*Primary Examiner* — Walter L Lindsay, Jr.
*Assistant Examiner* — Milton Gonzalez
(74) *Attorney, Agent, or Firm* — Stanzione & Kim, LLP

(57) ABSTRACT

An image forming apparatus, a fixing unit and a belt assembly thereof are disclosed. The image forming apparatus, the fixing unit and the belt assembly includes a frame, a belt rotatably disposed at an outer periphery of the frame, and a lateral slip prevention member which presses at least a portion of the belt to cause the belt to move in a direction of mitigating undesirable lateral movement of the belt.

20 Claims, 7 Drawing Sheets

IMAGE FORMING APPARATUS INCLUDING LATERAL SLIP PREVENTION MEMBER

CROSS-REFERENCE TO RELATED APPLICATION

This application claims the benefit of Korean Patent Application No. 10-2008-0057392, filed on Jun. 18, 2008 in the Korean Intellectual Property Office, the disclosure of which is incorporated herein by reference.

TECHNICAL FIELD

The present invention relates to an image forming apparatus, a fixing unit and a belt assembly thereof, and, more particularly, to an image forming apparatus capable of minimizing lateral slip of a belt in a belt assembly, a fixing unit and a belt assembly thereof.

BACKGROUND OF RELATED ART

An image forming apparatus is an apparatus, for example, a printer, a copying machine, a fax machine and a multi-functional machine having combination of one or more functions thereof, which prints an image on a printing medium such as paper.

An electro-photographic image forming apparatus, which is one type of the image forming apparatus, includes an exposing unit, a transfer unit, a developing unit, a fixing unit and the like, which are disposed in a main body forming the external appearance of the apparatus, to print an image on the printing medium.

Broadly speaking, a printing medium carrying developer image on its surface is subjected to a high-temperature and high-pressure state in the fixing unit to have the developer image fixed on the printing medium.

The fixing unit typically includes rollers rotating in engagement with each other. For example, a heat roller is rotated by a rotational force applied to a press roller. Meanwhile, the heat roller has a belt which is wound on an outer surface of a frame and is rotated.

However, in a conventional image forming apparatus, the lateral slippage of the belt during its rotation may result in, for example, the damages to the belt.

SUMMARY OF DISCLOSURE

In accordance with an aspect of the invention, there is provided a belt assembly that may include a frame at an outer periphery of which a belt is rotatably supported and a lateral slip prevention member arranged to come into a pressing contact with at least a portion of any surface of the belt to cause the belt to move in a direction of reducing an offset between a longitudinal center of the frame and a longitudinal center of the belt.

The lateral slip prevention member may be actuated by the moving force that causes the movement of the belt in a direction of increasing the offset.

The lateral slip prevention member may include a contact portion configured and arranged to contact the belt when the belt moves toward the lateral slip prevention member and a pressing portion configured to move in interlocking manner with the contact portion to come into the pressing contact with the portion of the surface of the belt.

The lateral slip prevention member may include a first rib configured and arranged to contact a side surface of the belt to receive a moving force in the longitudinal direction of the belt and a second rib movable, by the moving force received by the first rib, to contact the portion of the surface of the belt.

The first and second ribs may be provided so as to be not perpendicular with respect to each other. The first rib may be inclined toward the belt.

The first rib and the second rib may form an acute angle therebetween.

The lateral slip prevention member may further include a rotation shaft about which the second rib rotates toward the portion of the surface of the belt as a result of the moving force received by the first rib.

The lateral slip prevention member may further include an elastic member which provides an elastic force to the first rib so as to bias the second rib in a direction away from the portion of the surface of the belt.

The second rib may include a curved contact portion which forms a curved surface with which to contact the portion of the surface of the belt.

The second rib may include a rolling portion which presses the portion of the surface of the belt, and which is rotated by being in the pressing contact with the belt that rotates.

The ratio of the respective lengths of the first and second rib ranges from 0.1 to 10.

The lateral slip prevention member may be disposed adjacent to at least one of opposite side surfaces of the belt, and may be configured to be capable of contacting an inner surface of the belt.

According to another aspect, a belt assembly may include a belt rotatably supported at an outer periphery of a frame and a lateral slip prevention member configured to operate by a moving force exerted on the belt in a longitudinal direction of the frame, and to thereby press at least one of inner and outer surfaces of the belt to prevent an interference between a side surface of the belt and another portion of the belt assembly.

According to yet another aspect, a fixing unit of an image forming apparatus may include a pressing member configured to rotate, a heating member in close contact with an outer surface of the pressing member, a belt which forms the outer surface of the heating member, and which is rotated by a rotational force of the pressing member; and a lateral slip prevention member configured to contact the belt to move the belt in a first direction opposite to a second direction in which the belt moves towards any one of opposite ends of the heating member.

The lateral slip prevention member may include a contact portion configured and arranged to contact the belt when the belt moves toward the lateral slip prevention member and a pressing portion configured to move in interlocking manner with the contact portion to come into a pressing contact with the belt.

The lateral slip prevention member may include a first rib configured and arranged to contact a side surface of the belt when the belt moves in a lateral direction and a second rib formed by bending one end of the first rib, and which is configured to come into contact with at least one of inner and outer surfaces of the belt.

The lateral slip prevention member may further include a rotation shaft disposed at a bent portion between the first and second ribs and an elastic member configured to provides an elastic bias to the lateral slip prevention member such that the second rib separates from the at least one of inner and outer surfaces of the belt.

According to yet another aspect, an image forming apparatus may include a feed path along which a printing medium is fed and a fixing unit disposed on the feed path. The fixing unit may include a press roller and a heat roller disposed to oppose each other and a lateral slip prevention member configured to make pressing contact with at least one of inner and outer surfaces of a belt that forms an outer surface of the heat roller such that the belt rotates without extending beyond either of opposite ends of the heat roller by more than a distance.

The lateral slip prevention member may include a first rib configured to come into contact with a side surface of the belt, a second rib formed by bending the first rib such that an acute angle is formed between the first and second ribs, the second rib being oriented to come into a pressing contact with a surface of the belt, and a rotation shaft which is disposed at a bent portion between the first and second ribs to allow a contact force the first rib receives from the side surface of the belt to be exerted on the second rib in a different direction that causes the second rib move towards the pressing contact.

The second rib may include a contact surface in contact with the belt, the contact surface having a curved shape to reduce a friction with the belt.

According to even yet another aspect, a belt assembly may include a belt configured to rotate about a rotational axis and a lateral movement prevention member. The lateral movement prevention member may include a contact portion configured to contact a first portion of the belt when the belt moves in a lateral direction substantially parallel to the rotational axis, and to thereby receive a contact force in the lateral direction, and a press portion configured to contact a second portion of the belt, and to thereby exert a pressing force on the second portion of the belt in a direction substantially perpendicular to the lateral direction.

The lateral movement prevention member may be bent into two portions at an angle between the portions. The contact portion and the press portion may each be respective one of the two portions. The lateral movement prevention member may further include a pivot point provided between the two portions, and about which each of the contact portion and the press portion rotate such that the contact force received by the contact portion in the lateral direction is transmitted to the press portion in a different direction substantially perpendicular to the lateral direction.

The angle between the contact portion and the press portion may be an acute angle.

The belt assembly may further include an elastic member configured to exert an elastic bias to the lateral movement prevention member in a direction of moving the press portion away from the second portion of the belt.

The belt assembly may further include a heater roller frame on which the belt is rotatably supported, the heater roller frame and the belt together forming a heater roller; and a press roller arranged to extend parallel to, and to face and oppose, the belt such that the press roller rotates the belt by being in a pressing contact with the belt.

BRIEF DESCRIPTION OF THE DRAWINGS

Various aspects of the present disclosure will become apparent and more readily appreciated from the following description of the embodiments, taken in conjunction with the accompanying drawings, of which.

DETAILED DESCRIPTION OF SEVERAL EMBODIMENTS

Figure 1:
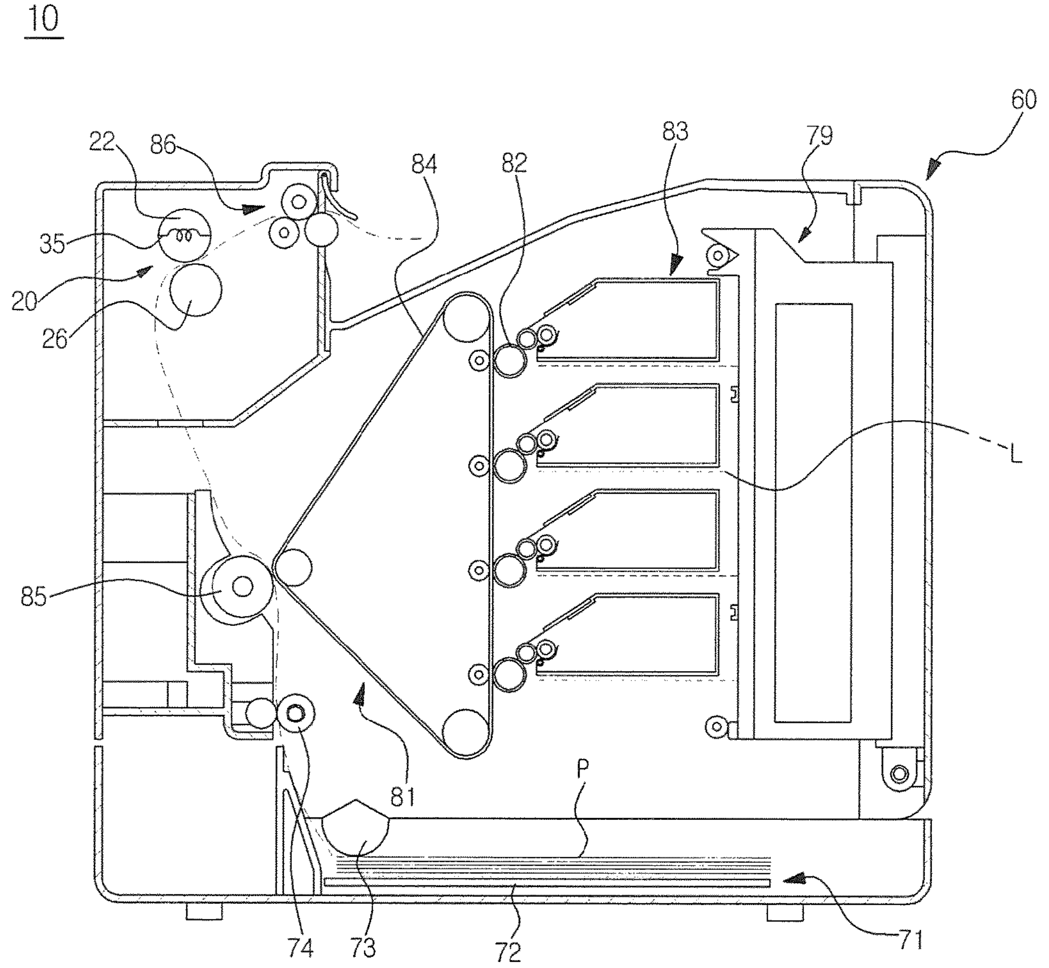
FIG. 1 is a cross-sectional view illustrating an image forming apparatus according to an embodiment of the present invention.

Reference will now be made in detail to embodiments of the present invention, examples of which are illustrated in the accompanying drawings, wherein like reference numerals refer to like elements throughout.

Figure 2:
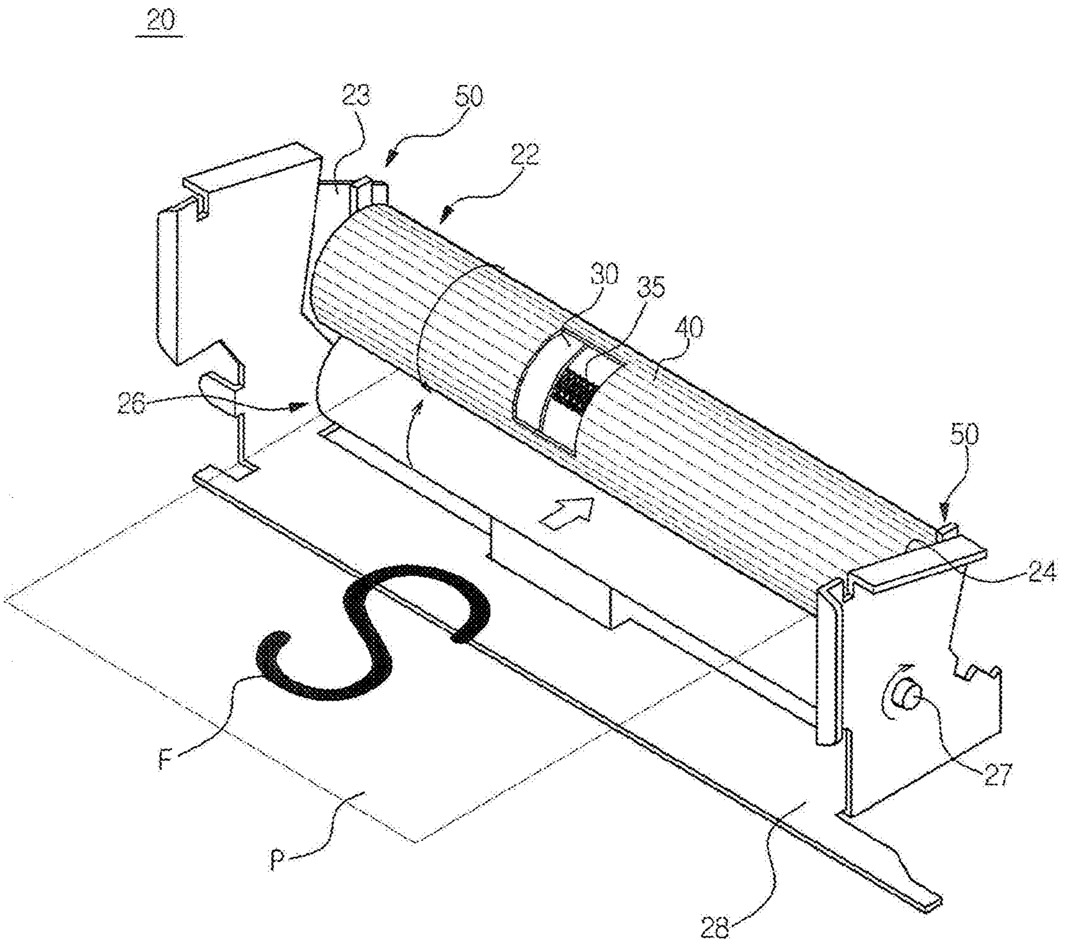
FIG. 2 is a partially cutaway perspective view of the fixing unit shown in FIG. 1.

FIG. 1 is a cross-sectional view of an image forming apparatus according to an embodiment of the present invention. FIG. 2 is a partially cutaway perspective view of the fixing unit of FIG. 1.

As shown in FIGS. 1 and 2, an image forming apparatus 10 according to an embodiment may include a paper supply unit 71, a light scanning unit 79, a developing unit 81, a fixing unit 20 and a discharge unit 86, some or all of which may be disposed in a main body 60.

The paper supply unit 71 may include a tray 72 on which a printing medium P is loaded, and a pickup roller 73 which picks up the printing medium P loaded on the tray 72 sheet by sheet. The printing medium P picked up by the pickup roller 73 is fed to a transfer unit 85 by a feed roller 74.

The light scanning unit 79 scans light to image carriers 82 before the printing medium P enters the transfer unit 85. In the embodiment shown in FIG. 1, the image carriers 82 are respectively disposed corresponding to developing devices 83 containing developers of respective different colors and the developing devices 83 are arranged in a vertical direction. However, the number and arrangement of the image carriers 82 and the developing devices 83 are not limited to what is shown in FIG. 2, and may be in various other numbers and/or arrangements. Electrostatic latent images are formed on the surfaces of the image carriers 82 by light L scanned from the light scanning unit 79.

The transfer unit 85 may be in the form of a transfer roller which rotates while being engaged or in pressing contact with an intermediary transfer member 84. Although the intermediary transfer member 84 shown as a belt in FIG. 1, other structure, for example, a circular drum may be used for the intermediary transfer member 84. When the electrostatic latent images are formed on the image carriers 82 by the light scanning unit 79, the developers contained in the developing devices 83 are applied to the electrostatic latent images of the image carriers 82, thereby forming a visible image. The visible image of developer of a respective color carried on each of the image carriers 82 are transferred in overlapping manner over to the intermediary transfer member 84, thereby forming a image in multiple colors, which is in turn transferred on to the printing medium P at the transfer unit 85. The printing medium P carrying the transferred image is discharged out of the main body 60 by passing through the fixing unit 20 and the discharge unit 86.

The developer image F transferred to the printing medium P is fixed on the printing medium P by the fixing unit 20. During the image forming process described above, the developer from the image carriers 82 is transferred to the printing medium P through the intermediary transfer member 84 and the transfer unit 85. However, since the developer image F so transferred to the printing medium P is attracted to the surfaces of the printing medium P primarily by an electrostatic attractive force, when, for example, an external force is applied to the printing medium P, the developer may become separated from the surfaces of the printing medium P. In order to more permanently fix the developer image F on the printing medium P, the printing medium P carrying the image F is made to pass through between a press roller 26 and a heat roller 22 of the fixing unit 20. It should be noted that although one press roller 26 is disposed corresponding to one heat roller 22 in FIG. 1, the number of the press roller 26 and the heat roller 22 is not so limited, and that there can be any number of rollers.

The press roller 26 is disposed at one side of the path of the printing medium P, and presses against the printing medium P as it passes between the press roller 26 and the heat roller 22. In this regard, the press roller 26 may be elastically biased toward the heat roller 22 by an elastic body (not shown), such as, e.g., a spring or the like. Accordingly, the printing medium P passing between the press roller 26 and the heat roller 22 is subjected to a pressure, and the developer image F is pressed into the surface of the printing medium P by the pressure. According to an embodiment, the press roller 26 serves as the driving unit in the fixing unit 20. That is, the press roller shaft 27 may be connected to, e.g., a driving motor (not shown), the driving forced of which rotates the press roller 26. Being in a pressing contact with the press roller 26, the heat roller 22 also rotates as the press roller 26 rotates. In an alternative embodiments, the heat roller 22 or both the press roller 26 and the heat roller 22 may be driven.

The heat roller 22 is a heating unit which fixes the image F by transferring heat to the printing medium P. The heat roller 22 is heated to a temperature of, e.g., 180° C. or more. The developer in the image F is pressed while passing through the press roller 26 and, at the same time, becomes melted while passing through the heat roller 22, thereby being fixed or fused to the surface of the printing medium P. The heat roller 22 includes a heating part 35, a frame 30 which maintains a shape of the heat roller 22, and a belt 40 which is rotatably disposed at an outer periphery of the frame 30.

The heating part 35 is disposed in the heat roller 22 to generate the heat. A first print output time (FPOT), which refers to the time the image forming apparatus 10 takes to discharge the first printing medium P, is in correlation with the time required to heat the heat roller 22 to an appropriate temperature with the heating part 35. Thus in order to shorten FPOT, it is necessary to heat the heat roller 22 from room temperature to a sufficiently high temperature capable of melting the developer in a short period of time. In this regard, the heating part 35 may employ a lamp heating method using radiant heat of a halogen lamp, an induction heating method using resistance heating of an induction coil, or the like.

The frame 30 is made of aluminum having high thermal conductivity. Accordingly, heat generated in the heating part 35 is quickly transferred to the frame 30 and then transferred to the belt 40 covering an outer portion of the frame 30. The frame 30 defines the basic structure of the heat roller 22. The frame 30 has a circular cylindrical shape, i.e., is in the shape of a right cylinder. A portion of the frame 30 in contact with the belt 40 may be coated with oil such that the belt 40 can rotate smoothly. According to an embodiment, the frame 30, while defining the general shape of the heat roller 22, remains stationary. That is, the frame 30 defines the cylindrical shape the belt 40 takes on while rotating around the frame 30, but is itself fixed to the fixing unit main body 28.

The belt 40 is disposed to rotate about the outer periphery of the frame 30. As the press roller 26 rotates, it serves as the driving roller, and drives the belt 40 of the heat roller 22 to rotate. The belt 40 may be formed by, e.g., coating rubber having a thickness of about, e.g., 200 μm on a metal plate having a thickness of about, e.g., 40 μm. When the belt 40 disposed on the outer peripheral surface of the frame 30 is rotated by the rotational force of the press roller 26, a lateral slip of the belt 40, in which the belt 40 moves to the left or to the right during rotation, may occur due to various factors, for example, assembly tolerance between the frame 30 and the belt 40, temperature distribution between the frame 30 and the belt 40, or the like. When the belt 40 slips left or right, the discharge direction of the printing medium P passing through the fixing unit 20 may deviate from its intended direction. Further, a side surface 44 (see FIG. 4) of the belt 40 may come in contact with the left wall surface 23 or the right wall surface 24 of the main body 28 of the fixing unit 20, the interfering contact of which may result in the reduction of the useful life of the belt 40. According to an embodiment therefore, lateral slip prevention members 50 that are provided to mitigate lateral slip of the belt 40, and that may uses the same lateral force resulting from the lateral movement of the belt 40.

Figure 3:
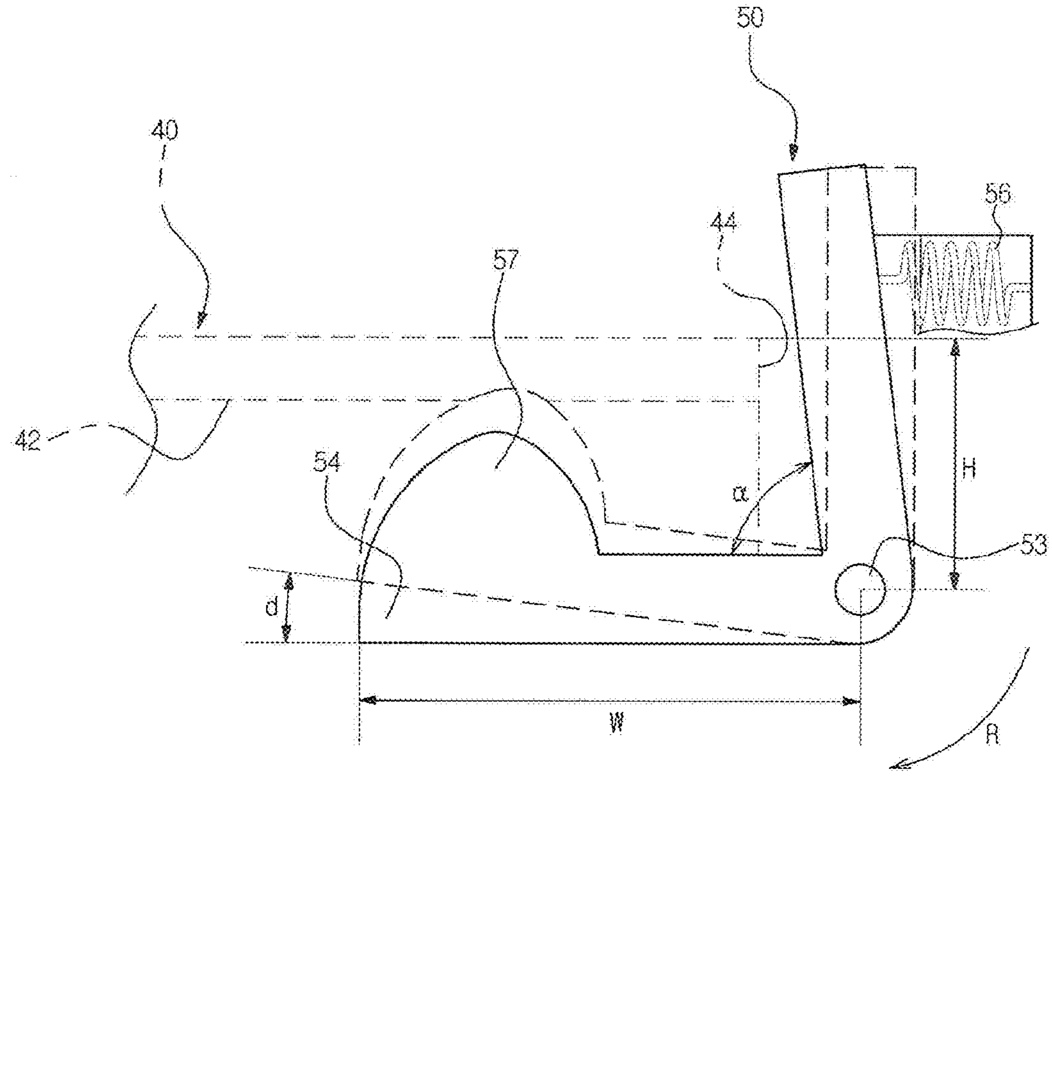
FIG. 3 is a side view of lateral slip prevention members shown in FIG. 2.

In particular, FIG. 3 illustrates a side view of a lateral slip prevention member 50 shown in FIG. 2. As shown in FIG. 3, each of the lateral slip prevention members 50 according to the embodiment includes a first rib 52 (See FIG. 4) that comes in contact with the side surface 44 of the belt 40 to receive the lateral force therefrom, a rotation shaft 53 transferring the force received by the first rib 52 to a second rib 54 to cause the second rib 54 to come into contact with an inner surface 42 of the belt 40 and an elastic member 56, which provides an elastic bias towards the direction of separating the second rib 54 from the inner surface 42.

The lateral slip prevention members 50 are disposed adjacent to at least one of the left and the right surfaces of the belt 40 to prevent the lateral movement of the belt 40. The lateral slip prevention members 50 prevent the belt 40 from moving sideway, i.e., in the longitudinal direction of the frame 30 (see FIG. 2), thereby reducing the deviation of the longitudinal center of the belt 40 from the longitudinal center of the frame 30 (see FIG. 2). By maintaining the belt 40 in its intended orientation during rotation, and thus reducing the interfering contacts between the side surface 44 of the belt 40 with the left and right wall surfaces 23 and 24 (see FIG. 2), damages to the side surface 44 may be reduced. According to the above embodiments, the lateral slip prevention members 50 may prevent lateral slip of the belt 40 with a relatively simple structure, and, although could be provided, may not require an additional driving unit. That is, the lateral slip prevention members 50 may be operated to return the belt 40 to its proper rotational orientation using the very lateral force that had caused the lateral slip of the belt 40.

The first rib 52 includes a contact portion that comes into contact with the side surface 44 of the belt 40 when the belt 40 moves laterally toward the first rib 52. While the belt 40 may be arranged horizontally with the first rib 52 generally arranged to extend vertically, according to an embodiment, the first rib 52 may be provided to be inclined toward the belt 40 rather than being strictly vertical. That is, it is preferable that an angle α between the first rib 52 and the second rib 54 be an acute angle. With the first rib 52 tilting toward the belt 40, after the first rib 52 contacts the side surface 44 of the belt 40, the second rib 54 may be required to rotate a shorter distance to come into contact with the inner surface 42 of the belt 40, thereby reducing the time required to operate the lateral slip prevention member 50.

The rotation shaft 53 may be disposed at the bent portion between the first rib 52 and the second rib 54. When the first rib 52 comes in contact with the side surface 44 of the belt 40, a horizontal force is transferred to the first rib 52 due to the horizontal movement of the belt 40. The horizontal force transferred to the first rib 52 by the belt 40 is converted into a rotational force in the rotational direction R by the rotation shaft 53.

The second rib 54 rotates in the rotational direction R toward the inner surface 42 of the belt 40 by the rotational force of the rotation shaft 53. The length from a contact portion between the side surface 44 of the belt 40 and the first rib 52 to the rotation shaft 53 is shown in FIG. 3 as the height H. The distance from the rotation shaft 53 to the distal end of the second rib 54 is referred to as the width W. The height H and the width W may be adjusted such that the width W divided by the height H results in a value in the range of 0.1 to 10. If the width W divided by the height H is small, the height H is relatively large. Taking the principle of a lever into account, if the height H is large, even though the moving force transferred from the side surface 44 of the belt 40 to the first rib 52 is relatively small, the second rib 54 can make contact with the inner surface 42 with a relatively large force. On the other hand, if the width W divided by the height H is large, the width W is relatively large. If the width W is large, even though the side surface 44 of the belt 40 moves the first rib 52 by a relatively small distance, the second rib 54 can be made to rotate by a relatively large distance, which may in turn result in a shorter time for the second rib 54 to contact the inner surface 42. In consideration of the above, the width W and the height H may be adjusted, e.g., so that the width W divided by the height H ranges from 0.1 to 10. The angle d by which the second rib 54 rotates from its initial position to the position of the contact with the inner surface 42 may be within a range from 0 to 45 degrees. The rotated angle d may be determined in conjunction with the above-described determination of the ratio of the width W to the height H.

A curved contact portion 57 is disposed at an end of the second rib 54, substantial portion of which may make contact with the inner surface 42 of the belt 40. If the end of the second rib 54 is made in a shape that exhibits a sharp edge of point, it may cause damage to the belt 40. In order to prevent such damages, the end of the second rib 54 in contact with the belt 40, according to an embodiment, is formed in a curved shape, thereby providing a smoother or arcuate contact surface to minimize the damages to the belt 40. While the curved contact portion 57 is illustrated in FIG. 3 as an example, it is possible to use other types of contact surfaces, for example, one or more rollers (not shown), may be provided at the end of the second rib 54 for contacting the inner surface 42. The roller(s) (not shown) may be made to rotate with the rotational force of the belt 40 while concurrently pressing the inner surface 42, thereby minimizing damages to the belt 40.

The elastic member 56 provides an elastic force in a manner to keep the second rib 54 separated from the inner surface 42 of the belt 40. To that end, the elastic member 56 provides a bias for the lateral slip prevention member 50 to rotate in the opposite direction to the rotational direction R with respect to the rotation shaft 53 and return to its initial position (shown in solid line in FIG. 3) when the side surface 44 of the belt 40 and the first rib 52 are not in contact with each other. Alternatively, in some other embodiments, the elastic member 56 may not be necessary if the lateral slip prevention member 50 is able return to its initial position by its own weight.

An operation of the lateral slip prevention members having the configuration according to the above embodiments will be described with reference to FIGS. 4 and 5.

Figure 4:
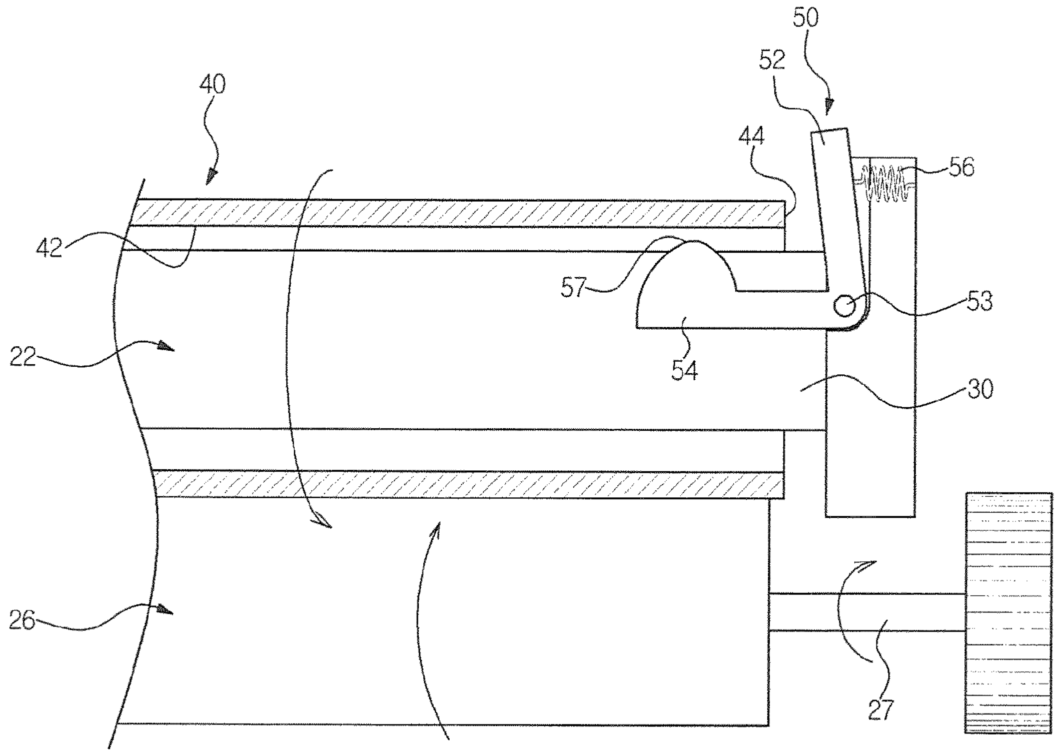
FIGS. 4 and 5 are cross-sectional views showing an operation of the fixing unit of FIG. 2.
Figure 5:
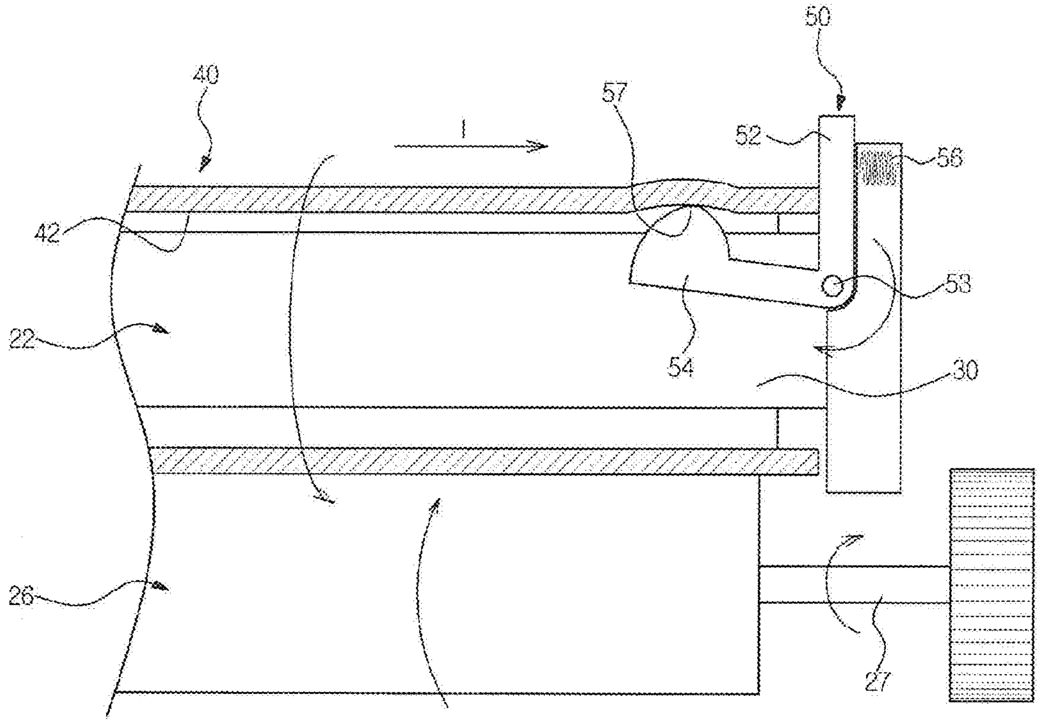

FIGS. 4 and 5 illustrate cross-sectional views showing an operation of the fixing unit of FIG. 2.

As shown in the drawings, the lateral slip prevention members 50 are disposed at the opposite side surfaces of the belt 40. When driven by, e.g., a driving motor (not shown), the press roller 26 rotates about the press roller shaft 27. The belt 40 disposed on the outer surface of the heat roller 22 is in turn rotates in pressing contact with the rotating press roller 26. Meanwhile, the heating part 35 (sec FIG. 2) disposed in the heat roller 22 is operated to rapidly increase the temperature of the heat roller 22.

During operation, one portion of contact between the belt 40 and the frame 30 may be subjected to a force different from other portions due to one or more of factors, for example, imprecise assembly, which may or may not be within the design tolerance, in the belt 40 and/or the frame 30, non-uniform thermal expansion due to non-uniform temperature distribution across the belt 40 and/or the frame 30, small deformations of the rotated belt 40, and/or the like. That is, the force applied to the contact portion of the belt 40 and the frame 30 may have non-uniform distribution, causing force instability or disequilibrium.

When force instability is generated in the belt 40, a moving force is generated to restore an instable state to a stable or equilibrium state, and, since the belt 40 is disposed on the outer surface of the frame 30, the restorative moving force causes the belt 40 to move to the left or right with respect to the frame 30.

As described above, a phenomenon, in which deformation or displacement occurs in transition from an instable state to a stable state to minimize energy potential, is sometimes referred to as ‘minimum total potential energy principle’. Under the principle of minimum total potential energy, for example, a bead placed in a hollow bowl moves to the lowest portion of the bowl where it may rest, and a tree branch with snow droops downward. In the above-mentioned examples, the lowest portion or the stable state represents the position of minimum potential energy, that is, a state of equilibrium.

If the belt 40 were to be left in the position of being shifted to the left or right side of the frame 30, the side surface 44 of the belt 40 which interferes with other portions of the fixing unit 20 may become damaged. The lateral slip prevention member 50 applies a force corresponding to the moving force of the belt 40, thereby returning the belt 40 to its intended position.

The side surface 44 of the belt 40, which has moved in the I direction by the moving force generated due to force instability, reaches the first rib 52. When the belt 40 is in contact with the first rib 52 to transfer the moving force to the first rib 52, the lateral slip prevention member 50 rotates or pivots about the rotation shaft 53, and the second rib 54 moves into a contact with the inner surface 42 of the belt 40.

The contact by the second rib 54 subjects the inner surface 42 of the belt 40 with a force, and may deform the portion of the inner surface 42. Applying the aforementioned principle of minimum total potential energy, while the belt 40 had been moved in the I direction by the moving force applied to the belt 40 to remove the force instability, the second rib 54 applies another force, which causes another force instability condition that counteracts with the moving force that had caused the initial lateral movement of the belt 40. When the force instability created by the second rib 54 counteracts the initial force instability that caused the moving force exerted to move the belt 40 in the direction I, the force distributed on the belt 40 reaches a state of equilibrium such that the belt 40 remains at this position. When the force instability caused by the second rib 54 becomes larger, in order to remove the added instability generated by the second rib 54, it results in a moving force in the direction opposite to the I direction to return the belt 40 to its proper position.

The lateral slip prevention member 50 causes the belt 40 to return to its proper position by exerting a force to the belt 40 that is proportional in strength to the force moving the belt 40 in the lateral direction. That is, the second rib 54 presses the inner surface 42 of the belt 40 with stronger force if the belt 40 presses the first rib 52 due to a larger moving force while the second rib 54 presses the inner surface 42 of the belt 40 with a weaker force if the belt 40 presses the first rib 52 due to a smaller moving force. Further adjustment to the magnitude of the force by which the second rib 54 presses the inner surface 42 can be made by adjusting the sizes of the first and second ribs 52 and 54 and/or the angle between the first and second ribs 52 and 54. That is, it is possible to return the belt 40 in the opposite direction to the I direction in which the belt 40 has moved by adjusting the aforementioned factors. Accordingly, it is possible to prevent a contact between the side surface 44 of the belt 40 and other parts of the fixing unit 20.

Figure 6:
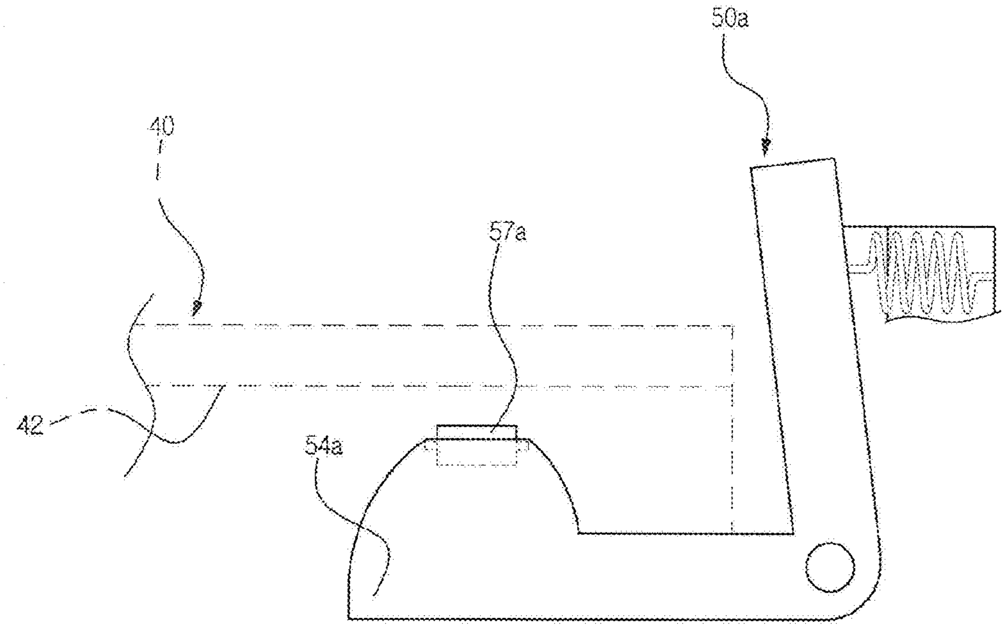
FIG. 6 is a side view of lateral slip prevention members according to another embodiment.

FIG. 6 illustrates a side view of lateral slip prevention members according to another embodiment, only those aspects of which that are different from the previously described embodiments will be described. The features that are identical to those of the previous embodiments are designated by the same reference numerals while those modified features are designated by reference numerals to which is added a suffix 'a.'

According to the embodiment, a lateral slip prevention member 50*a* includes a rolling portion 57*a* disposed at an end of a second rib 54*a* pressing the inner surface 42 of the belt 40. The rolling portion 57*a* is disposed to rotate in a rotational direction of the rotated belt 40. The rolling portion 57*a* reduces the friction and/or minimizes damages to the belt 40.

Figure 7:
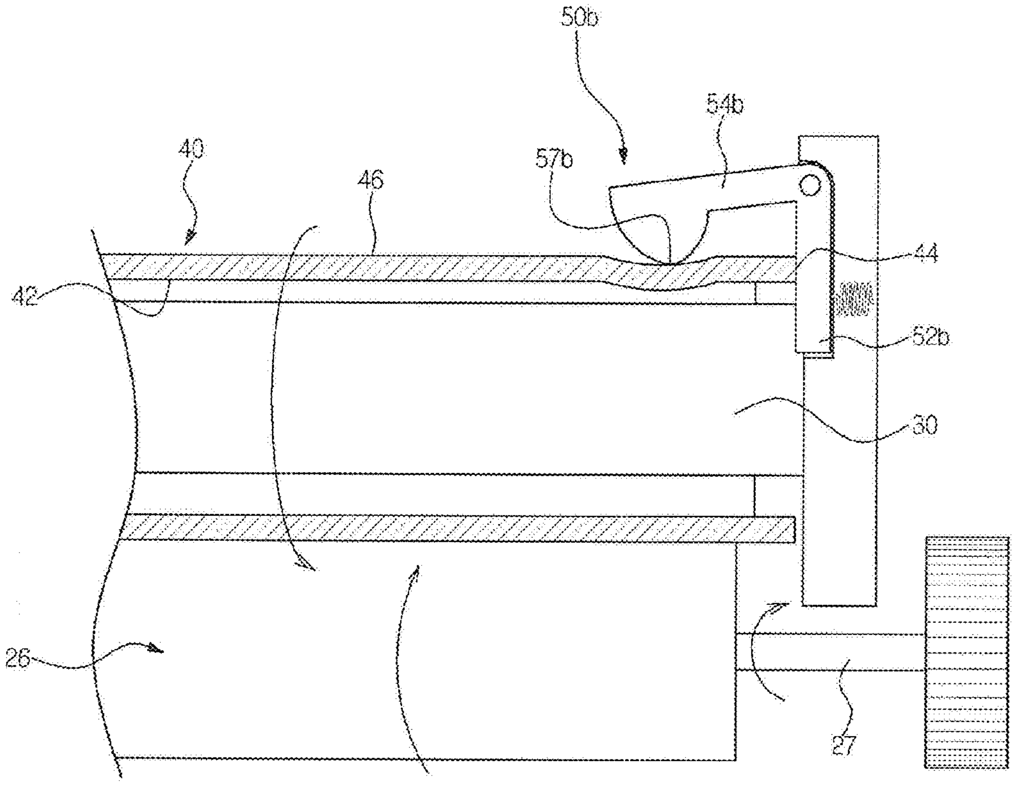
FIG. 7 is a cross-sectional view showing an operation of lateral slip prevention members according to another embodiment.

FIG. 7 illustrates a cross-sectional view showing an operation of lateral slip prevention members according to another alternative embodiment, only those aspects of which that are different from the previously described embodiments will be described. The features that are identical to those of the previous embodiments are designated by the same reference numerals while those modified features are designated by reference numerals to which is added a suffix 'b.'

A lateral slip prevention member 50*b* as shown in FIG. 7 presses an outer surface 46 of the belt 40, rather than the inner surface 42. A curved contact portion 57*b* is formed at an end of a second rib 54*b* in contact with the outer surface 46. A first rib 52*b* is connected to the second rib 54*b*. An amount of oil may sometimes be coating the inner surface 42 of the belt 40 to reduce friction with the frame 30. As the belt 40 is rotated, the coated oil may be discharged to the outer surface 46 through the side surface 44. In this case, the curved contact portion 57*b* in contact with the outer surface 46 may also serve to wipe the oil discharged to the outer surface 46.

Although the lateral slip prevention member 50*b* is shown to press the upper portion of the outer surface 46 of the belt 40, the lateral slip prevention member 50*b* may be installed at any position of the outer surface 46, for example, a side end of the belt 40, as long as it does not interfere with the press roller 26.

Further, although a portion in contact with the outer surface 46 of the second rib 54*b* is illustrated as being the curved contact portion 57*b* in the above embodiment, alternative shape or configuration of the contact portion, for example, a rolling portion similar to one illustrated in FIG. 6, may alternatively be used.

It should also be noted that while two lateral slip prevention members disposed at opposite ends of the belt are described above, any number of the lateral slip prevention members may be provided.

It should also be apparent that while the lateral slip prevention member is described above as having the second rib bent towards the first rib at a specific angle, an equivalent structure can be obtained by bending the first rib toward the second rib.

Although embodiments of the present invention have been shown and described, it would be appreciated by those skilled in the art that changes may be made in the embodiments without departing from the principles and spirit of the invention, the scope of which is defined in the claims and their equivalents.

What is claimed is:

1. A belt assembly, comprising:
- a frame;
- a belt rotatably supported at an outer periphery of the frame; and
- a lateral slip prevention member comprising a first rib and a second rib formed as a single body, the second rib extending at an angle from the first rib, the slip prevention member configured to pivot about a rotation shaft when the first rib is contacted by a first surface of the belt, due to the belt being offset, such that the second rib contacts a second surface of the belt to move the belt in a direction that reduces the offset of the belt.

2. The belt assembly according to claim 1, wherein the lateral slip prevention member is configured to pivot in response to contact with the first surface of the belt.

3. The belt assembly according to claim 1, wherein the angle between the first rib and the second rib is not a right angle.

4. The belt assembly according to claim 1, wherein the angle between the first rib and the second rib is an acute angle.

5. The belt assembly according to claim 1, wherein the first and second ribs rotate about the rotation shaft when the belt contacts the first rib.

6. The belt assembly according to claim 1, wherein the lateral slip prevention member further comprises an elastic member that provides an elastic force to the first rib, so as to bias the second rib away from the belt.

7. The belt assembly according to claim 1, wherein the second rib has a curved surface to contact the second surface of the belt.

8. The belt assembly according to claim 1, wherein the second rib comprises a roller to contact the second surface of the belt.

9. The belt assembly according to claim 1, wherein a ratio of a length of the first rib to a length of the second rib ranges from 0.1 to 10.

10. The belt assembly according to claim 1, wherein:
- the first surface of the belt is an edge surface of the belt; and
- the second surface of the belt is an inner or outer surface of the belt.

11. A fixing unit of an image forming apparatus, comprising:
- a heating member comprising a heating part and a belt disposed around the heating part;
- a pressing member to rotate while contacting the belt; and
- a lateral slip prevention member comprising a first rib and a second rib formed as a single body, the second rib extending at an angle from the first rib, the slip prevention member configured to pivot around a rotation shaft when the first rib is contacted by a first surface of the belt, due to the belt being offset, such that the second rib contacts a second surface of the belt to reduce the offset of the belt.

12. The fixing unit according to claim 11, wherein the lateral slip prevention member further comprises:
- a rotation shaft disposed at the vertex between the first and second ribs; and
- an elastic member configured to provide an elastic bias to the lateral slip prevention member, such that the second rib is separated from the belt, when the belt is not offset.

13. An image forming apparatus, comprising:

a feed path along which a printing medium is fed; and a fixing unit disposed on the feed path, the fixing unit comprising:

a heat roller comprising a belt;

a press roller to rotate in contact with the heat roller; and a lateral slip prevention member comprising a first rib and a second rib formed as a single body, the second rib extending at an angle from the first rib, the slip prevention member configured to pivot around a rotation shaft when the first rib is contacted by a first surface of the belt, due to the belt being offset, such that the second rib contacts contact a second surface of the belt to reduce the offset of the belt.

14. The image forming apparatus according to claim 13, wherein the lateral slip prevention member comprises: a rotation shaft disposed at the vertex between the first and second ribs, such that the first and second ribs are pivotable about the rotation shaft.

15. The image forming apparatus according to claim 13, wherein the second rib has a curved surface to contact the belt.

16. A belt assembly, comprising:

a belt configured to rotate about a rotational axis; and a single body lateral movement prevention member that comprises:

a contact portion configured to move when contacted by a first surface of the belt, due to the belt being offset in a direction substantially parallel to the rotational axis; and a press portion extending from the contact portion at an angle and configured to move when the contact portion is moved, so as to contact a second surface of the belt to reduce the offset of the belt.

17. The belt assembly of claim 16, wherein the lateral movement prevention member pivots about a pivot point disposed between the press portion and the contact portion when the belt contacts the contact portion, such that a contact force received by the contact portion is transmitted to the press portion to move the press portion into contact with the belt.

18. The belt assembly of claim 16, wherein the angle between the contact portion and the press portion is an acute angle.

19. The belt assembly of claim 16, further comprising: an elastic member configured to exert an elastic bias to the lateral movement prevention member, to bias the press portion away from the belt.

20. A belt assembly comprising:

a frame;

a belt rotatably supported on an outer periphery of the frame; and a lateral slip prevention member disposed to selectively contact the belt, to move the belt in a first direction that reduces an offset between the longitudinal center of the frame and the longitudinal of the belt, the lateral slip member comprising:

a first rib configured to move in a second direction, when contacted by a side surface of the belt;

a second rib connected at a first end to the first rib and extending from the first rib at an angle and configured to move in conjunction with the first rib, so as to contact another surface of the belt at a second end opposite the first end; and a rotation shaft about which the first and second ribs rotate such that the second rib rotates toward the other surface of the belt in accordance with the movement of the first rib.

* * * * *